UNITED STATES PATENT OFFICE.

FRANK FORSTER, OF ORCHID, FLORIDA.

INSECTICIDE, FUNGICIDE, AND SOIL ANTISEPTIC.

1,105,642. Specification of Letters Patent. Patented Aug. 4, 1914.

No Drawing. Application filed April 7, 1913. Serial No. 759,429.

*To all whom it may concern:*

Be it known that I, FRANK FORSTER, a citizen of the United States, residing at Orchid, in the county of St. Lucie and State of Florida, have invented certain new and useful Improvements in Insecticides, Fungicides, and Soil Antiseptics, of which the following is a specification.

My invention relates to a composition of matter for treating fruit trees, growing crops, and the like, to destroy injurious insect life and fungi, scale, and like parasitic organisms.

The principal object of the invention is to provide a composition of matter of this character which can be inexpensively and conveniently manufactured, easily applied to the trees or crops, which will adhere thereto, and which, furthermore, while destroying the injurious organisms, will not affect the friendly ones which protect the plant. The compound may also be used as a soil antiseptic.

The compound is made by mixing together copper sulfate, sulfur and lime, preferably according to one of the two methods set forth below and in the proportions as hereinafter specified, to-wit: I take five pounds of copper sulfate ($CuSO_4, 5H_2O$) in the form of a commercial blue vitriol or blue stone, ten pounds of flowers of sulfur and eighty-five pounds of caustic lime, and having mixed the same thoroughly together, sprinkle the mixture with water which is introduced a little at a time. The water slakes the lime and the heat generated brings about certain chemical reactions between the ingredients. An analysis of the compound made exactly as above described shows that it consists approximately of—

| | |
|---|---|
| Sulfur | 0.80% |
| Sulfid of copper | 1.20% |
| Sulfate of calcium | 19.50% |
| Sulfid of calcium | 0.50% |
| Lime in the form of carbonate, hydrate and oxid | 71.00% |
| Water and carbon dioxid | 7.00% |
| | 100.00% |

If desired, the amount of the sulfur ingredient might be increased from ten per cent., as above given, up to twenty per cent. by weight as a whole and the percentage of lime proportionately decreased.

Instead of employing the method above described, I may use slaked lime instead of quick lime, in which case the amount used, proportioned to the other ingredients, will be double. When slaked lime is used the moisture and heat used for bringing about the necessary chemical reactions between the ingredients may be supplied by means of steam. The mixing in this case will preferably be done in a closed vessel containing suitable agitating means in which a steam pressure may be maintained giving a temperature not in excess of 300° Fahrenheit. In either method there might be slight variations in the amount of the copper sulfate used.

After the compounding of the ingredients is complete, whether method (1) or method (2) be followed, the mixture should be allowed to stand until dry. The product is a dry powder (if lumpy it may be ground), and can be applied to fruit trees or field crops as the ordinary dry insecticides are applied, that is, with a paddle or gun, either to the branches, foliage and fruit, or to the soil. It will be found that the powder will readily adhere to the plant. Moreover, while destructive to organisms injurious to the plant, it will not affect certain friendly organisms such, for example, as the lady bug scale eater which destroys the injurious fungoid growths on fruit trees. The ordinary insecticides or fungicides destroy this friendly organism as well as the injurious ones, with the result that their use has to be frequently repeated.

I claim:

1. An insecticide, fungicide and soil antiseptic consisting of a dry powder made by subjecting a mixture of five per cent., by weight, of copper sulfate mixed with from ten to twenty per cent. of sulfur and from eighty-five to seventy-five per cent. of lime simultaneously, in the presence of moisture, to sufficient heat to cause chemical reactions between said ingredients.

2. An insecticide, fungicide and soil antiseptic consisting of a dry powder composed essentially of sulfur, sulfid of copper, sulfate of calcium and lime.

3. An insecticide, fungicide and soil antiseptic consisting of a dry powder containing the following substances in substantially the proportions as follows: sulfur .80 per cent., sulfid of copper 1.20 per cent., sulfate of calcium, 19.50 per cent., sulfid of calcium .50 per cent., and lime 71 per cent.

4. The process of making an insecticide, fungicide and soil antiseptic which consists in mixing together copper sulfate in an amount equal to five per cent. of the whole with from ten to twenty per cent. of sulfur and from eighty-five to seventy-five per cent. of lime and simultaneously subjecting the same, in the presence of moisture, to a temperature sufficient to produce chemical reactions between said ingredients.

FRANK FORSTER.

Witnesses:
CHAS. H. ELMORE,
L. A. COPELAND.